United States Patent
Chen et al.

(10) Patent No.: US 8,328,558 B2
(45) Date of Patent: *Dec. 11, 2012

(54) CHINESE / ENGLISH VOCABULARY LEARNING TOOL

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,534

(22) Filed: Jan. 13, 2012

(65) Prior Publication Data

US 2012/0178058 A1 Jul. 12, 2012

Related U.S. Application Data

(63) Continuation of application No. 10/631,068, filed on Jul. 31, 2003, now Pat. No. 8,137,105.

(51) Int. Cl.
*G09B 19/00* (2006.01)

(52) U.S. Cl. ........ 434/156; 434/157; 434/322; 434/323; 434/350

(58) Field of Classification Search .......... 434/156–157, 434/322, 323, 350
See application file for complete search history.

(56) References Cited

U.S. PATENT DOCUMENTS

| | | | |
|---|---|---|---|
| 4,611,996 A | 9/1986 | Stoner | |
| 4,951,202 A | 8/1990 | Yan | |
| 5,039,358 A | 8/1991 | Birkle et al. | |
| 5,319,552 A | 6/1994 | Zhong | |
| 5,321,607 A | 6/1994 | Fukumochi et al. | |
| 5,444,445 A | 8/1995 | Chu | |
| 5,490,061 A | 2/1996 | Tolin et al. | |
| 5,525,060 A | 6/1996 | Loebner | |
| 5,541,837 A | 7/1996 | Fushimoto | |
| 5,583,761 A | 12/1996 | Chou | |
| 5,608,622 A | 3/1997 | Church | |
| 5,697,789 A | 12/1997 | Sameth et al. | |
| 5,832,478 A | 11/1998 | George | |
| 5,835,924 A | 11/1998 | Maruyama et al. | |
| 5,873,111 A | 2/1999 | Edberg | |
| 5,897,630 A | 4/1999 | Schneider Huddleston Virta et al. | |
| 5,974,372 A | 10/1999 | Barnes et al. | |

(Continued)

OTHER PUBLICATIONS

Notice of Allowance, dated Nov. 24, 2008, regarding U.S. Appl. No. 11/109,088, 8 pages.

(Continued)

*Primary Examiner* — Robert J Utama
(74) *Attorney, Agent, or Firm* — Yee & Associates, P.C.; Rudolf O. Siegesmund; Mark C. Vallone (57) ABSTRACT

In a method for teaching a vocabulary, a computer receives a user selection of a chapter from a plurality of chapters in a Chinese-English textbook, a user selection of a language in which to display questions in a user interface, wherein the language in which to display the questions is one of English, Simplified Chinese, Traditional Chinese, and Pin Yin, and a user selection of a language in which to receive answers to the questions in the user interface, wherein the language in which to receive the answers is another of the one of English, Simplified Chinese, Traditional Chinese, and Pin Yin. The computer determines a question including a vocabulary word in the chapter and in the language in which to display the questions. In response to receiving an answer to the question in the language in which to receive the answers, the computer determines if the answer is correct.

20 Claims, 8 Drawing Sheets

U.S. PATENT DOCUMENTS

| | | | |
|---|---|---|---|
| 5,983,169 | A | 11/1999 | Kozma |
| 6,022,221 | A | 2/2000 | Boon |
| 6,023,714 | A | 2/2000 | Hill et al. |
| 6,061,646 | A | 5/2000 | Martino et al. |
| 6,073,146 | A | 6/2000 | Chen |
| 6,077,085 | A | 6/2000 | Parry et al. |
| 6,094,666 | A | 7/2000 | Li |
| 6,192,332 | B1 | 2/2001 | Golding |
| 6,223,150 | B1 | 4/2001 | Duan et al. |
| 6,224,383 | B1 | 5/2001 | Shannon |
| 6,243,713 | B1 | 6/2001 | Nelson et al. |
| 6,266,668 | B1 | 7/2001 | Vanderveldt et al. |
| 6,275,789 | B1 | 8/2001 | Moser et al. |
| 6,314,469 | B1 | 11/2001 | Tan et al. |
| 6,346,990 | B1 | 2/2002 | Watanabe et al. |
| 6,349,147 | B1 | 2/2002 | Pong et al. |
| 6,381,567 | B1 | 4/2002 | Christensen et al. |
| 6,393,389 | B1 | 5/2002 | Chanod et al. |
| 6,438,515 | B1 | 8/2002 | Crawford et al. |
| 6,522,330 | B2 | 2/2003 | Kobayashi |
| 6,567,973 | B1 | 5/2003 | Yamamoto et al. |
| 6,829,620 | B2 | 12/2004 | Hsing et al. |
| 6,905,340 | B2 | 6/2005 | Stansvik |
| 6,993,473 | B2 | 1/2006 | Cartus |
| 6,999,082 | B2 | 2/2006 | Nishimura |
| 6,999,916 | B2 | 2/2006 | Lin et al. |
| 7,040,987 | B2 | 5/2006 | Walker et al. |
| 7,051,019 | B1 | 5/2006 | Land et al. |
| 7,065,484 | B2 | 6/2006 | Low et al. |
| 7,085,707 | B2 | 8/2006 | Milner |
| 7,099,944 | B1 | 8/2006 | Anschutz et al. |
| 7,165,019 | B1 | 1/2007 | Lee et al. |
| 7,194,411 | B2 | 3/2007 | Slotznick et al. |
| 7,228,269 | B2 | 6/2007 | Xun |
| 7,376,648 | B2 | 5/2008 | Johnson |
| 7,389,223 | B2 | 6/2008 | Atkin et al. |
| 7,516,062 | B2 | 4/2009 | Chen et al. |
| 7,542,908 | B2 | 6/2009 | Segond et al. |
| 7,676,357 | B2 | 3/2010 | Chen et al. |
| 7,871,002 | B2 | 1/2011 | Smith et al. |
| 7,917,351 | B2 | 3/2011 | Chen et al. |
| 7,958,446 | B2 | 6/2011 | Seitz et al. |
| 8,001,118 | B2 | 8/2011 | Dean et al. |
| 8,027,438 | B2 | 9/2011 | Daigle et al. |
| 8,041,556 | B2 | 10/2011 | Chen et al. |
| 8,137,105 | B2 | 3/2012 | Chen et al. |
| 2001/0019329 | A1 | 9/2001 | Kobayashi |
| 2001/0029542 | A1 | 10/2001 | Nishimura |
| 2001/0037332 | A1 | 11/2001 | Miller et al. |
| 2002/0022953 | A1 | 2/2002 | Bertolus et al. |
| 2002/0069047 | A1 | 6/2002 | Ma et al. |
| 2002/0085018 | A1 | 7/2002 | Chien |
| 2002/0123988 | A1 | 9/2002 | Dean et al. |
| 2002/0151366 | A1 | 10/2002 | Walker et al. |
| 2002/0194300 | A1 | 12/2002 | Lin et al. |
| 2003/0027122 | A1 | 2/2003 | Stansvik |
| 2003/0040899 | A1 | 2/2003 | Ogilvie |
| 2003/0078921 | A1 | 4/2003 | Michael Hsing et al. |
| 2003/0115040 | A1 | 6/2003 | Xing |
| 2003/0180699 | A1 | 9/2003 | Resor |
| 2004/0078204 | A1 | 4/2004 | Segond et al. |
| 2004/0205671 | A1 | 10/2004 | Sukehiro et al. |
| 2005/0010391 | A1 | 1/2005 | Chen et al. |
| 2005/0010392 | A1 | 1/2005 | Chen et al. |
| 2005/0026118 | A1 | 2/2005 | Chen et al. |
| 2005/0027547 | A1 | 2/2005 | Chen et al. |
| 2005/0289168 | A1 | 12/2005 | Green et al. |
| 2006/0072143 | A1 | 4/2006 | Wilson |
| 2006/0080083 | A1 | 4/2006 | Lin et al. |
| 2006/0089928 | A1 | 4/2006 | Johnson |
| 2006/0133585 | A1 | 6/2006 | Daigle et al. |
| 2006/0184352 | A1 | 8/2006 | Chen et al. |
| 2006/0209276 | A1 | 9/2006 | Smith et al. |
| 2006/0235677 | A1 | 10/2006 | Chen et al. |
| 2006/0265652 | A1 | 11/2006 | Seitz et al. |
| 2007/0129932 | A1 | 6/2007 | Chen et al. |
| 2007/0136334 | A1 | 6/2007 | Schleppenbach et al. |
| 2007/0208813 | A1 | 9/2007 | Blagsvedt et al. |
| 2007/0269775 | A1 | 11/2007 | Andreev et al. |
| 2009/0157379 | A1 | 6/2009 | Chen et al. |

OTHER PUBLICATIONS

Office Action, dated Nov. 2, 2009, regarding U.S. Appl. No. 12/389,806, 19 pages.

Final Office Action, dated May 12, 2010, regarding U.S. Appl. No. 12/389,806, 9 pages.

Notice of Allowance, dated Nov. 19, 2010, regarding U.S. Appl. No. 12/389,806, 13 pages.

Appeal Brief, dated Feb. 29, 2008, regarding U.S. Appl. No. 10/631,068, 27 pages.

"CEL (Chinese-English Lookup) Software for Windows, Version 2.0," http://web.archive.org/web/20010309104519/http://home.iprimus.com.au/richwarm/cel/cel, Feb. 15, 2001, 3 pages.

"On-Line Chinese Tools," http://web.archive.org/web/20010206033905/www.mandarintools.com/cintro.html, Jan. 9, 2007, 3 pages.

"Pinyin to Unicode," http://web.archive.org/web/20021206035901/http://foolsworkshop.com/ptou, Jul. 24, 2002, 1 page.

Hughes, "1ICT3 Computer Science Sample Paper I," University of Dublin, Trinity College, Dublin, Ireland, 1998, 6 pages.

Office Action, dated Jan. 24, 2007, regarding U.S. Appl. No. 10/617,526, 19 pages.

Final Office Action, dated May 16, 2007, regarding U.S. Appl. No. 10/617,526, 16 pages.

Office Action, dated Oct. 17, 2007, regarding U.S. Appl. No. 10/617,526, 13 pages.

Appeal Brief, dated Mar. 17, 2008, regarding U.S. Appl. No. 10/617,526, 47 pages.

Response to Non-Compliant Appeal Brief, dated Apr. 2, 2008, regarding U.S. Appl. No. 10/617,526, 29 pages.

Examiner's Answer, dated Oct. 5, 2009, regarding U.S. Appl. No. 10/617,526, 17 pages.

Reply Brief, dated Dec. 3, 2009, regarding U.S. Appl. No. 10/617,526, 10 pages.

Office Action, dated Jan. 24, 2007, regarding U.S. Appl. No. 10/617,530, 14 pages.

Final Office Action, dated May 22, 2007, regarding U.S. Appl. No. 10/617,530, 16 pages.

Office Action, dated Oct. 17, 2007, regarding U.S. Appl. No. 10/617,530, 13 pages.

Appeal Brief, dated Mar. 5, 2008, regarding U.S. Appl. No. 10/617,530, 39 pages.

Response to Notification of Non-Compliant Appeal Brief, dated Apr. 30, 2008, regarding U.S. Appl. No. 10/617,530, 7 pages.

Examiner's Answer, dated Jun. 20, 2008, regarding U.S. Appl. No. 10/617,530, 21 pages.

Office Action, dated Oct. 28, 2008, regarding U.S. Appl. No. 10/617,530, 18 pages.

Final Office Action, dated Apr. 8, 2009, regarding U.S. Appl. No. 10/617,530, 19 pages.

Office Action, dated Jun. 16, 2009, regarding U.S. Appl. No. 10/617,530, 27 pages.

Examiner's Answer, dated Sep. 10, 2009, regarding U.S. Appl. No. 10/617,530, 23 pages.

Reply Brief, dated Nov. 6, 2009, regarding U.S. Appl. No. 10/617,530, 9 pages.

Office Action, dated May 30, 2006, regarding U.S. Appl. No. 10/631,068, 14 pages.

Response to Office Action, dated Aug. 30, 2006, regarding U.S. Appl. No. 10/631,068, 12 pages.

Final Office Action, dated Jan. 3, 2007, regarding U.S. Appl. No. 10/631,068, 11 pages.

Response to Final Office Action, dated Mar. 5, 2007, regarding U.S. Appl. No. 10/631,068, 11 pages.

Office Action, dated Jun. 14, 2007, regarding U.S. Appl. No. 10/631,068, 10 pages.

Response to Office Action, dated Sep. 14, 2007, regarding U.S. Appl. No. 10/631,068, 10 pages.

Final Office Action, dated Nov. 21, 2007, regarding U.S. Appl. No. 10/631,068, 10 pages.
Response to Notification of Non-Compliant Appeal Brief, dated Apr. 3, 2008, regarding U.S. Appl. No. 10/631,068, 7 pages.
Office Action, dated Jan. 26, 2009, regarding U.S. Appl. No. 10/631,068, 12 pages.
Appeal Brief, dated Apr. 7, 2009, regarding U.S. Appl. No. 10/631,068, 30 pages.
Examiner's Answer, dated Jul. 9, 2009, regarding U.S. Appl. No. 10/631,068, 17 pages.
Reply Brief, dated Sep. 4, 2009, regarding U.S. Appl. No. 10/631,068, 17 pages.
Decision on Appeal, dated Aug. 4, 2011, regarding U.S. Appl. No. 10/631,068, 8 pages.
Notice of Allowance, dated Nov. 9, 2011, regarding U.S. Appl. No. 10/631,068, 11 pages.
Office Action, dated Jan. 24, 2007, regarding U.S. Appl. No. 10/631,070, 18 pages.
Final Office Action, dated May 15, 2007, regarding U.S. Appl. No. 10/631,070, 19 pages.
Office Action, dated Oct. 17, 2007, regarding U.S. Appl. No. 10/631,070, 11 pages.
Appeal Brief, dated Mar. 17, 2008, regarding U.S. Appl. No. 10/631,070, 39 pages.
Response to Non-Compliant Appeal Brief, dated Apr. 2, 2008, regarding U.S. Appl. No. 10/631,070, 11 pages.
Examiners Answer, dated Oct. 5, 2009, regarding U.S. Appl. No. 10/631,070, 15 pages.
Reply Brief, dated Dec. 3, 2009, regarding U.S. Appl. No. 10/631,070, 8 pages.
Office Action, dated Oct. 31, 2007, regarding U.S. Appl. No. 11/060,359, 15 pages.
Office Action, dated Apr. 10, 2008, regarding U.S. Appl. No. 11/060,359, 25 pages.
Final Office Action, dated Oct. 20, 2008, regarding U.S. Appl. No. 11/060,359, 31 pages.
Office Action, dated Apr. 1, 2009, regarding U.S. Appl. No. 11/060,359, 27 pages.
Notice of Allowance, dated Oct. 20, 2009, regarding U.S. Appl. No. 11/060,359, 11 pages.
Office Action, dated Jan. 28, 2008, regarding U.S. Appl. No. 11/109,088, 17 pages.
Final Office Action, dated Jul. 29, 2008, regarding U.S. Appl. No. 11/109,088, 8 pages.

Chapter 3 Vocabulary

| English | Simplified Chinese | Traditional Chinese | Pin Yin |
|---|---|---|---|
| Sunday | 星期月 | 星期月 | xīng qī rì |
| Monday | 星期一 | 星期一 | xīng qī yī |
| Tuesday | 星期二 | 星期二 | xīng qī èr |
| Wednesday | 星期三 | 星期三 | xīng qī sān |
| Thursday | 星期四 | 星期四 | xīng qī sì |
| Friday | 星期五 | 星期五 | xīng qī wǔ |
| Saturday | 星期六 | 星期六 | xīng qī liù |
| January | 一月 | 一月 | yī yuè |
| February | 二月 | 二月 | èr yuè |
| March | 三月 | 三月 | sān yuè |
| April | 四月 | 四月 | sì yuè |
| May | 五月 | 五月 | wǔ yuè |
| June | 六月 | 六月 | liù yuè |
| July | 七月 | 七月 | qī yuè |
| August | 八月 | 八月 | bā yuè |
| September | 九月 | 九月 | jiǔ yuè |
| October | 十月 | 十月 | shí yuè |
| November | 十一月 | 十一月 | shí yī yuè |
| December | 十二月 | 十二月 | shí èr yuè |
| Spring | 春天 | 春天 | chūn tiān |
| Summer | 夏天 | 夏天 | xià tiān |
| Autumn | 秋天 | 秋天 | qiū tiān |
| Winter | 冬天 | 冬天 | dōng tiān |
| Day | 号 | 號 | hào |
| Week | 星期 | 星期 | xīng qī |
| Month | 月 | 月 | yuè |
| Season | 季 | 季 | jì |
| Year | 年 | 年 | nián |

[Start vocabulary test]

CHINESE / ENGLISH VOCABULARY LEARNING TOOL

This application is a continuation of application Ser. No. 10/631,068, filed Jul. 31, 2003, now U.S. Pat. No. 8,137,105 issued Mar. 20, 2012.

FIELD OF THE INVENTION

The present invention is directed to a method for helping teach Chinese, English, and Pin Yin vocabulary.

BACKGROUND OF THE INVENTION

Sino-Tibetan based languages, such as Chinese, are vastly different than Latin based languages such as English. The Chinese language does not contain an alphabet. Instead, the Chinese language comprises more than 60,000 individual characters. Each of the 60,000 characters has a different meaning. Knowledge of about 1,200 characters is sufficient to read a Chinese newspaper. Chinese college graduates know about 3,000 characters.

Chinese also differs from Latin based languages in the concept of a word. In Chinese, strings of characters do not contain spaces and the interpretation of where one word ends and another starts is entirely based on context. Chinese characters are very precise in meaning, pronunciation, and in the way they are written. If a Chinese character has characters added to it in a string, the meaning of the first character is enhanced, but normally it is not changed.

Chinese characters are always pronounced as a single syllable. There are no two-syllable Chinese characters. Each Chinese character has one of five fundamental sounds. These five fundamental sounds give a singing quality to Chinese because some characters are pronounced with high tones, some with low tones, and some with tones that are rising or falling. Tone is fundamental to the language and Chinese would not be readily understood without the tones. For example, the character "ma" can either mean "mother" or "horse" or a "question" depending on the tone. In China many dialects are spoken. Spoken words are almost unintelligible from one dialect to the next. However, there is only one written Chinese. Written Chinese is understood by all dialects. Other Sino-Tibetan languages such as Japanese, Korean, and Vietnamese use several characters common to Chinese. However, these languages have no common written or spoken meaning, similar to the manner in which English, Spanish, and French use a common alphabet but are not otherwise interchangeable.

Following the Chinese Communist revolution in 1949, the Communist party made several changes to the Chinese language. First, the traditional method of writing Chinese from "top to bottom" and "right to left" was abandoned. The Peoples' Republic of China (PRC or mainland China) now follows Western languages and is written from "left to right" and then "top to bottom." Second, a single dialect was chosen, Mandarin, which is now taught in all schools as the primary Chinese language. Third, the PRC altered about one quarter of the characters to reduce them to around seven lines or strokes. This form of Chinese is called "Simplified Chinese." In the PRC, Simplified Chinese is now widely used, but the Republic of China (ROC or Taiwan) and Hong Kong still use the more elaborate form of Chinese called "Traditional Chinese." The PRC also adopted the Hindu-Arabic numbering system used by most Western countries and the advent of the Internet is causing English to appear in many Chinese sentences.

The PRC also introduced "Pin Yin," a phonetic version of Chinese to help young children learn the language. Pin Yin uses the 26 letters of the English alphabet plus 4 accents over certain vowels to indicate how the character should be pronounced. Pin Yin is normally used from about 4 years of age until around 7 years of age when the students are taught to use Chinese Characters. Pin Yin is also very helpful for tourists and businessmen to speak Chinese from phrase books. Additionally, Pin Yin is popular with computer users as it is the easiest way to enter Chinese characters from a keyboard.

In the computer, all Sino-Tibetan languages are represented by 16-bit characters, while English and the other Latin languages are normally represented by 8-bit characters. Traditionally, separate encodings were produced for each of the languages. English uses a 7 bit encoding called ASCII. ASCII encoding is included as the first seven bits of all the other encodings. European languages are normally 8 bit encodings and make use of the eighth bit for their special characters. Simplified Chinese uses GB2312 encoding and Traditional Chinese uses Big 5 encoding. A computer using Big 5 encoding cannot read computer code in GB2312. This multiplicity of encodings is confusing and there is no standardization between the different encodings. The Unicode consortium has developed a single encoding that incorporates all the major languages of the world. There is a strong movement to use Unicode and replace all the other encodings in computer applications. Unicode uses 16 bits for each character inside the computer. Unicode has 65,000 different characters and each of the major languages is mapped into a different section of this Unicode range. Consequently, Unicode can be used as a single encoding scheme for all of the world's languages.

Chinese characters are encoded entries which can be displayed in different font sizes. In other words, a computer may display the Chinese characters in different sizes similar to the method by which a computer displays English characters and words in different font sizes using ASCII. Changing the font size is very beneficial to students studying Chinese because the students may see the Chinese characters in greater detail.

Individual characters, letters, or symbols can be represented using different schemes within Unicode. Two of the most popular encoding schemes are UTF-8 and UCS-2. UTF-8 is a byte based Unicode encoding scheme which represents each character, letter, or symbol as one, two, or three bytes, each byte being eight bits. In contrast, UCS-2 is 16 bit encoding scheme which represents each character, letter, or symbol as 16 bits or four hexadecimal digits. One hexadecimal digit is equivalent to 4 bits, and 1 byte can be expressed by two hexadecimal digits. Table 1 below displays the difference between UTF-8 and UCS-2.

TABLE 1

| UCS-2 (Hexadecimal) | UTF-8 (Binary) | Description |
| --- | --- | --- |
| 0000 007F | 0xxxxxxx | ASCII |
| 0080 07FF | 110xxxxx 10xxxxxx | Up to U+07FF |
| 0800 FFFF | 1110xxxx 10xxxxxx 10xxxxxx | Other UCS-2 |

A user may choose to encode using the UCS-2 scheme or the UTF-8 scheme depending on the user's expected needs. For example, when transmitting data from one location to another, or when storing data in a database, UTF-8 is the preferred encoding scheme due to the transmission efficiency and the storage efficiency inherent in variable byte stream length (i.e. 1-3 bytes, as shown in Table 1). However, when holding the same information in a memory, UCS-2 is the encoding scheme. Conversion functions between UCS-2 and UTF-8 are available as evidenced by United States Patent Application Publication 2003/0078921 entitled "Table-Level Unicode Handling in a Database Engine," incorporated herein by reference.

Prior to the development of Unicode, a computerized character translator between Simplified Chinese and Traditional Chinese within the same encoding was impossible because of the inability of GB2312 code to understand Big 5 code, and vice-versa. If the user desired a computer-implemented translation, multiple encodings had to be used which did not permit simultaneous display of both forms of data.

Similarly, the prior art translation programs have been unable to display Pin Yin with the proper accents. Typically, these programs would use pictures in the form of gifs or jpegs to represent the characters. The accented vowels indicate the proper tone and are essential to proper pronunciation of Pin Yin. One technique that uses only the ASCII characters is based on adding a number after the Pin Yin word to indicate the accent as illustrated in Table 2.

TABLE 2

| Number | Accent | Description | Examples |
|---|---|---|---|
| 1 | - | Level Tone | ā ē ī ō ū |
| 2 | ´ | Rising Tone | á é í ó ú |
| 3 | ˇ | Falling Tone, then Rising Tone | ǎ ě ǐ ǒ ǔ |
| 4 | ` | Falling Tone | à è ì ò ù |
| 5 | (None) | No Change in Tone | a e i o u |

Thus, the prior art would display the word guó as guo2, the word mā as ma1, and so forth. The prior art hybrid version of Pin Yin is difficult for the beginning reader to understand because the reader must make a cognitive leap between the number and proper type and location of the accent. Therefore, a need exists for an automated method for translating between Simplified Chinese, Traditional Chinese, Pin Yin, and English. The need extends to a method for displaying the Pin Yin with the proper accent marks.

Moreover, a need exists for assisting students with learning Chinese vocabulary. Chinese textbooks typically contain a plurality of chapters covering different subjects. Each subject presents twenty to thirty Chinese vocabulary words which are related to the subject. The student then uses the vocabulary words by themselves, then in conjunction with vocabulary words from previous chapters. Because of the encoding limitations, a computer implemented process for assisting in the development of both Simplified and Traditional Chinese vocabulary has not previously been developed. Therefore, a need exists in the art for a computer-implemented method for helping a student learn Simplified Chinese, Traditional Chinese, accented Pin Yin and English.

SUMMARY OF THE INVENTION

A methodology for helping a student to learn vocabulary in Simplified Chinese, Traditional Chinese, English, and Pin Yin. In an illustrative embodiment, a method for teaching a vocabulary includes a computer receiving a user selection of a chapter from a plurality of chapters in a Chinese-English textbook, the chapter including a plurality of vocabulary words. The method further includes the computer receiving a user selection of a language in which to display questions in a user interface, wherein the language in which to display the questions is one of English, Simplified Chinese, Traditional Chinese, and Pin Yin. The method further includes the computer receiving a user selection of a language in which to receive answers to the questions in the user interface, wherein the language in which to receive the answers is another of the one of English, Simplified Chinese, Traditional Chinese, and Pin Yin, such that the language in which to display the questions and the language in which to receive the answers are different. The method further includes the computer determining a question, the question including a vocabulary word of the plurality of vocabulary words in the language in which to display the questions. The method further includes the computer receiving an answer to the question in the language in which to receive the answers, the answer including a vocabulary word. The method further includes, in response to receiving the answer, the computer determining if the answer is a correct answer.

In another illustrative embodiment, a computer program product for teaching a vocabulary includes one or more computer-readable tangible storage devices. The computer program product further includes program instructions that are stored on at least one of the one or more storage devices and that, when executed by a processor, receive a user selection of a chapter from a plurality of chapters in a Chinese-English textbook, the chapter including a plurality of vocabulary words. The computer program product further includes program instructions that are stored on at least one of the one or more storage devices and that, when executed by a processor, receive a user selection of a language in which to display questions in a user interface, wherein the language in which to display the questions is one of English, Simplified Chinese, Traditional Chinese, and Pin Yin. The computer program product further includes program instructions that are stored on at least one of the one or more storage devices and that, when executed by a processor, receive a user selection of a language in which to receive answers to the questions in the user interface, wherein the language in which to receive the answers is another of the one of English, Simplified Chinese, Traditional Chinese, and Pin Yin, such that the language in which to display the questions and the language in which to receive the answers are different. The computer program product further includes program instructions that are stored on at least one of the one or more storage devices and that, when executed by a processor, determine a question, the question including a vocabulary word of the plurality of vocabulary words in the language in which to display the questions. The computer program product further includes program instructions that are stored on at least one of the one or more storage devices and that, when executed by a processor, receive an answer to the question in the language in which to receive the answers, the answer including a vocabulary word. The computer program product further includes program instructions that are stored on at least one of the one or more storage devices and that, when executed by a processor, determine if the answer is a correct answer in response to receiving the answer.

In another illustrative embodiment, a computer system for teaching a vocabulary includes one or more processors and one or more computer-readable tangible storage devices. The computer system further includes program instructions that are stored on at least one of the one or more storage devices and that, when executed by at least one of the one or more processors, receive a user selection of a chapter from a plurality of chapters in a Chinese-English textbook, the chapter including a plurality of vocabulary words. The computer system further includes program instructions that are stored on at least one of the one or more storage devices and that, when executed by at least one of the one or more processors, receive a user selection of a language in which to display questions in a user interface, wherein the language in which to display the questions is one of English, Simplified Chinese, Traditional Chinese, and Pin Yin. The computer system further includes program instructions that are stored on at least one of the one or more storage devices and that, when executed by at least one of the one or more processors, receive a user selection of a language in which to receive answers to the questions in the user interface, wherein the language in which to receive the answers is another of the one of English, Simplified Chinese, Traditional Chinese, and Pin Yin, such that the language in which to display the questions and the language in which to receive the answers are different. The computer system further includes program instructions that are stored on at least one of the one or more storage devices and that, when executed by at least one of the one or more processors, determine a question, the question including a vocabulary word of the plurality of vocabulary words in the language in which to display the questions. The computer system further includes program instructions that are stored on at least one of the one or more storage devices and that, when executed by at least one of the one or more processors, receive an answer to the question in the language in which to receive the answers, the answer including a vocabulary word. The computer system further includes program instructions that are stored on at least one of the one or more storage devices and that, when executed by at least one of the one or more processors, determine if the answer is a correct answer in response to receiving the answer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "accented Pin Yin" means the Pin Yin phonetic version of the Chinese language with proper accents over the appropriate Roman letters.

As used herein, the term "ASCII" is an acronym for American Standard Code for Information Interchange and means the encoding language for Roman letters, Arabic numbers, control characters, and the various symbols present on a QWERTY keyboard.

As used herein, the term "Big 5" means the encoding language for the Traditional Chinese character set.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "GB2312" means the encoding language for the Simplified Chinese character set.

As used herein, the term "hybrid Pin Yin" means the Pin Yin phonetic version of the Chinese language without proper accents over the appropriate Roman letters, but instead with numbers in or at the end of the word to represent the accent marks.

As used herein, the term "unaccented Pin Yin" means the Pin Yin phonetic version of the Chinese language without proper accents over the appropriate Roman letters.

As used herein, the term "Unicode" means the encoding language developed by the Unicode consortium comprising most of the world's languages including the Simplified Chinese character set and the Traditional Chinese character set.

Figures 1, 3:
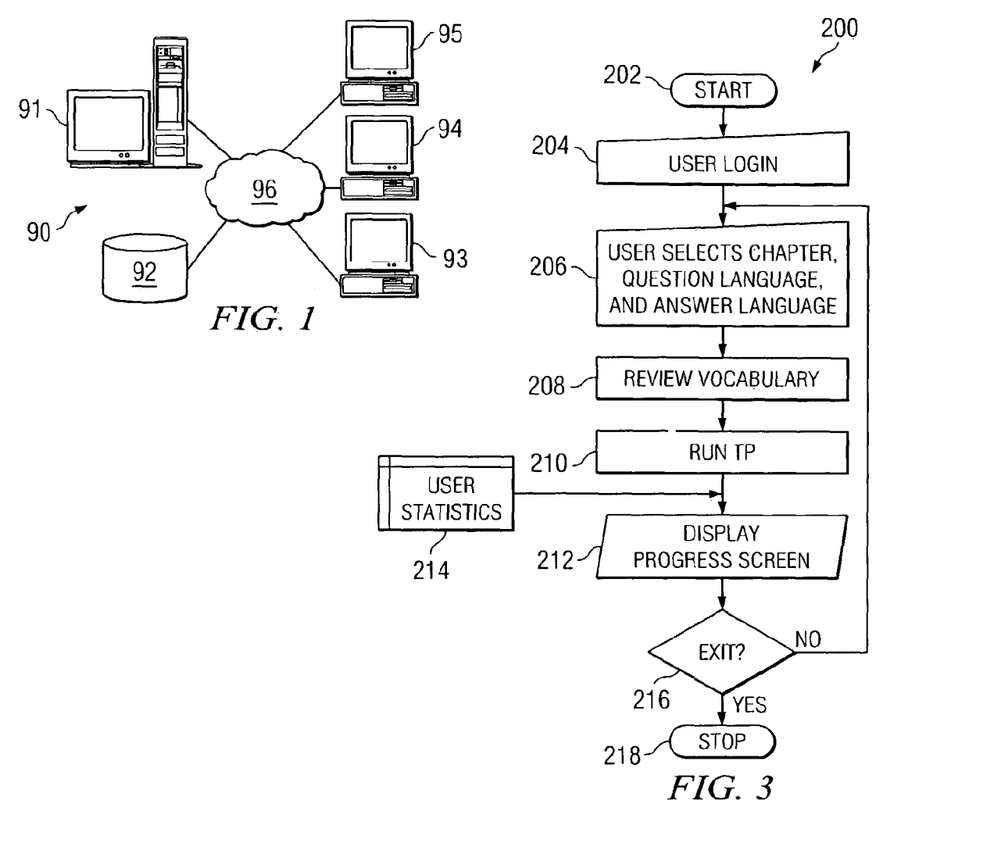
FIG. 1 is an illustration of a computer network used to implement the present invention.
FIG. 3 is an illustration of the logic of the Selection Program (SP) of the present invention.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
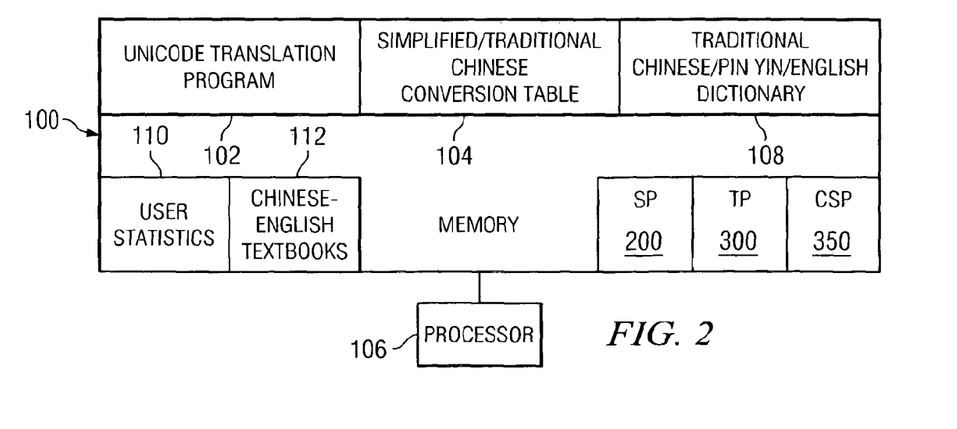
FIG. 2 is an illustration of the memory used to implement the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Selection Program (SP) 200, Testing Program (TP) 300, and Character Sizing Program (CSP) 350. SP 200, TP 300, and CSP 350 described herein can be stored within the memory of any computer depicted in FIG. 1. Alternatively, SP 200, TP 300, and CSP 350 can be stored in an external storage device such as a removable disk or a CD-ROM. Memory 100 is illustrative of the memory within one of the computers of FIG. 1. Memory 100 also contains Unicode Selection Program 102, Simplified Chinese/Traditional Chinese Conversion Table 104, Traditional Chinese/Pin Yin/English Dictionary 108, User Statistics 110, and Chinese-English textbooks 112. The present invention may interface with Unicode Selection Program 102, Simplified Chinese/Traditional Chinese Conversion Table 104, Traditional Chinese/Pin Yin/English Dictionary 108, User Statistics 110, and Chinese-English textbooks 112 through memory 100. As part of the present invention, the memory 100 can be configured with SP 200, TP 300, and/or CSP 350. Processor 106 can execute the instructions contained in SP 200, TP 300, and/or CSP 350.

In alternative embodiments, SP 200, TP 300, and/or CSP 350 can be stored in the memory of other computers. Storing SP 200, TP 300, and/or CSP 350 in the memory of other computers allows the processor workload to be distributed across a plurality of processors instead of a single processor. Further configurations of SP 200, TP 300, and/or CSP 350 across various memories are known by persons skilled in the art.

In the preferred embodiment, the present invention is a web page accessible from the Internet. SP 200 starts (202) when the user accesses the web page. The user then logs into the present invention by entering a user name and optionally a password (204). SP 200 then presents the user with a list of Chinese-English textbook chapters, question languages, and answer languages (206). The Chinese-English textbooks may be like Chinese-English textbooks 112 in FIG. 2. The Chinese-English textbooks contain a plurality of chapters in which each chapter addresses a different subject or theme. The user is presented with twenty to thirty vocabulary words for each chapter. Thus, by selecting the chapter, the user informs SP 200 of the vocabulary to be tested. The question language is the language in which the present invention will ask the user questions. The user may select English, Traditional Chinese, Simplified Chinese, Pin Yin, or any other language known to persons of ordinary skill in the art. The answer language is the language in which the user will answer the questions. The user may select English, Traditional Chinese, Simplified Chinese, Pin Yin, or any other language known to persons of ordinary skill in the art. The Graphical User Interface (GUI) for performing step 206 may be like GUI 400 in FIG. 6.

Returning to FIG. 3, SP 200 then displays the vocabulary for the user to review (208). The GUI for reviewing the vocabulary may be like GUI 500 in FIG. 7. Returning to FIG. 3, SP 200 then runs TP 300 (210). When the user has completed a chapter or decides to quit TP 300, SP 200 displays a progress screen (212). The progress screen displays the user's statistics 214 regarding the vocabulary from each of the chapters. The GUI for reviewing the statistics may be like GUI 700 in FIG. 12. Returning to FIG. 3, SP 200 then determines if the user wants to exit (216). If the user does not want to exit, then SP 200 returns to step 206. If the user wants to exit, then SP 200 ends (218).

Figure 4:
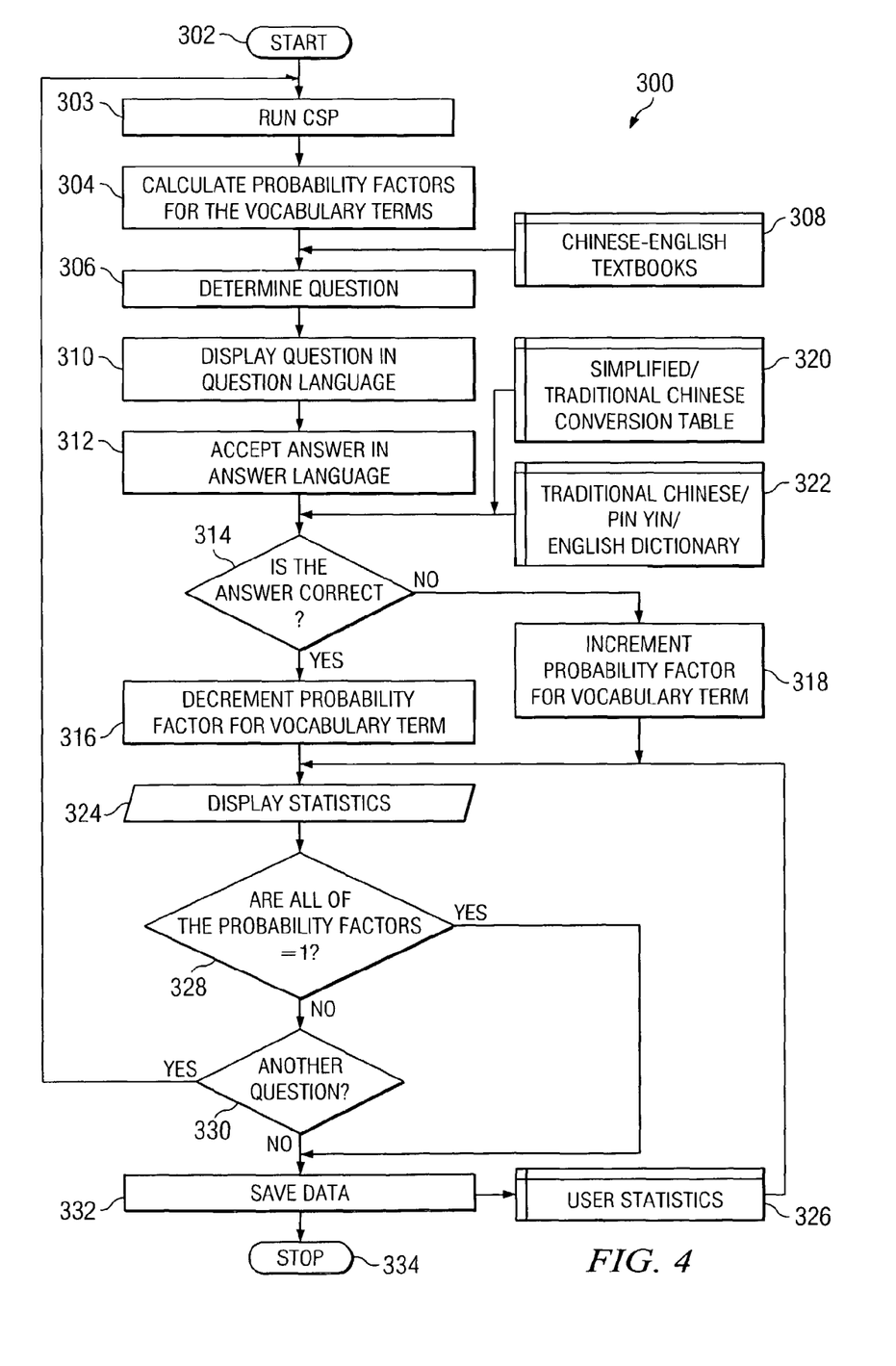
FIG. 4 is an illustration of the logic of the Testing Program (TP) of the present invention.

Turning to FIG. 4, the logic of Testing Program (TP) 300 is illustrated. TP 300 is a program which tests the user's knowledge of the vocabulary for a specific Chinese-English textbook chapter. TP 300 starts (302) when directed by SP 200. TP 300 then runs CSP 350 (303). CSP 350 is a program that resizes the Chinese character size on the GUI. Although CSP 350 is shown at step 303 in FIG. 4, the user may change the size of the Chinese characters at any time while running TP 300.

TP 300 determines probability factors for the vocabulary terms (304). Each vocabulary term is associated with a probability factor between one and nine. Initially, each vocabulary term is given a probability factor of five. The probability factors are used in computing the overall probability, and thus the frequency, of asking each vocabulary term. In other words, a vocabulary term with a probability factor of four is four times more likely to be asked than a vocabulary term with a probability factor of one. The probability factors are increased when the user incorrectly answers a question and decreased when the user correctly answers a question (see steps 316 and 318 below). Therefore, the vocabulary terms that the user is less familiar with are tested more frequently than those that the user is more familiar with.

TP 300 then determines a question to ask the user (306). TP 300 gets the vocabulary for the chapter from Chinese-English textbooks 308 stored in memory. Chinese-English textbooks 308 may be like Chinese-English textbooks 112 in FIG. 2. TP 300 determines which vocabulary question to ask based on the weighted probability of each question.

TP 300 then displays the question in the question language (310). The user enters the answer on the GUI and TP 300 accepts the user's answer in the answer language (312). TP 300 then determines if the answer is correct (314). To determine if the answer is correct, TP 300 accesses Simplified/Traditional Chinese Conversion table 320 and Traditional Chinese/Pin Yin/English Dictionary 322 to determine if the vocabulary term in the question matches the vocabulary term in the answer. The question vocabulary term and the answer vocabulary term will match if they are the same entry in Traditional Chinese/Pin Yin/English dictionary 322. Traditional Chinese/Pin Yin/English dictionary 322 is a dictionary, encoded in Unicode, containing entries for all of the Traditional Chinese characters with the accented Pin Yin and English translations. Where there may be more than one meaning for a given user input, Traditional Chinese/Pin Yin/English dictionary 322 gives the most commonly used word for the user input. Alternatively, Traditional Chinese/Pin Yin/English dictionary 322 could give some or all of the meanings for the user input. Traditional Chinese/Pin Yin/English dictionary 322 may be like Traditional Chinese/Pin Yin/English dictionary 108 in FIG. 2.

If either the question vocabulary term or the answer vocabulary term is in Simplified Chinese, TP 300 will need Simplified/Traditional Chinese Conversion Table 320 to translate the Simplified Chinese into Traditional Chinese. Simplified Chinese/Traditional Chinese Conversion Table 320 is a JAVA™ hashtable, encoded in Unicode, which contains a cross-reference between all of the Simplified Chinese characters and their equivalent Traditional Chinese characters. Simplified Chinese/Traditional Chinese Conversion Table 320 may be like Simplified Chinese/Traditional Chinese Conversion Table 104 in FIG. 2. The data in the hashtable is in the UCS-2 Unicode format. Because there are about 1,250 Simplified Chinese characters, the hashtable contains approximately 2,500 entries—one for each Simplified Chinese character and the Traditional Chinese equivalent.

If TP 300 determines that the answer is correct, then TP 300 indicates that the answer is correct, decrements the probability factor associated with the vocabulary term (316), and proceeds to step 324. The GUI for an incorrect answer may be like GUI 600 in FIGS. 8 and 9. Returning to FIG. 4, if TP 300 determines that the answer is incorrect, then TP 300 indicates that the answer is incorrect, displays the incorrect and correct answers, increments the probability factor for the vocabulary term (318), and proceeds to step 324. The GUI for an incorrect answer may be like GUI 600 in FIGS. 10 and 11.

Returning to FIG. 4, at step 324, TP 300 calculates and displays the user's statistics 326 for the chapter (324). User's statistics 326 may be like user statistics 110 in FIG. 2. TP 300 then determines whether all the probability factors are equal to one (328). If all the probability factors are equal to one, then TP 300 proceeds to step 332. If all the probability factors are not equal to one, then TP 300 determines if the user wants another question (330). The user will want another question if the user does not indicate a desire to quit. If the user wants another question, then TP 300 returns to step 303. If the user does not want another question, then TP 300 proceeds to step 332. At step 332, TP 300 saves the data for the current session (332). The data for the current session includes the User Statistics 326. TP 300 then ends (334).

As part of the present invention, the user may indicate the desired display size of the Simplified Chinese and/or the Traditional Chinese characters. Because the Chinese characters are encoded in Unicode, the font size of the characters may be easily changed. Previously, users have been able to change the font size of Simplified Chinese characters if the characters were encoded in GB2312, but could not display the Traditional Chinese characters. Similarly, users have been able to change the font size of Traditional Chinese characters if the characters were encoded in Big 5, but could not display the Simplified Chinese characters.

Figure 5:
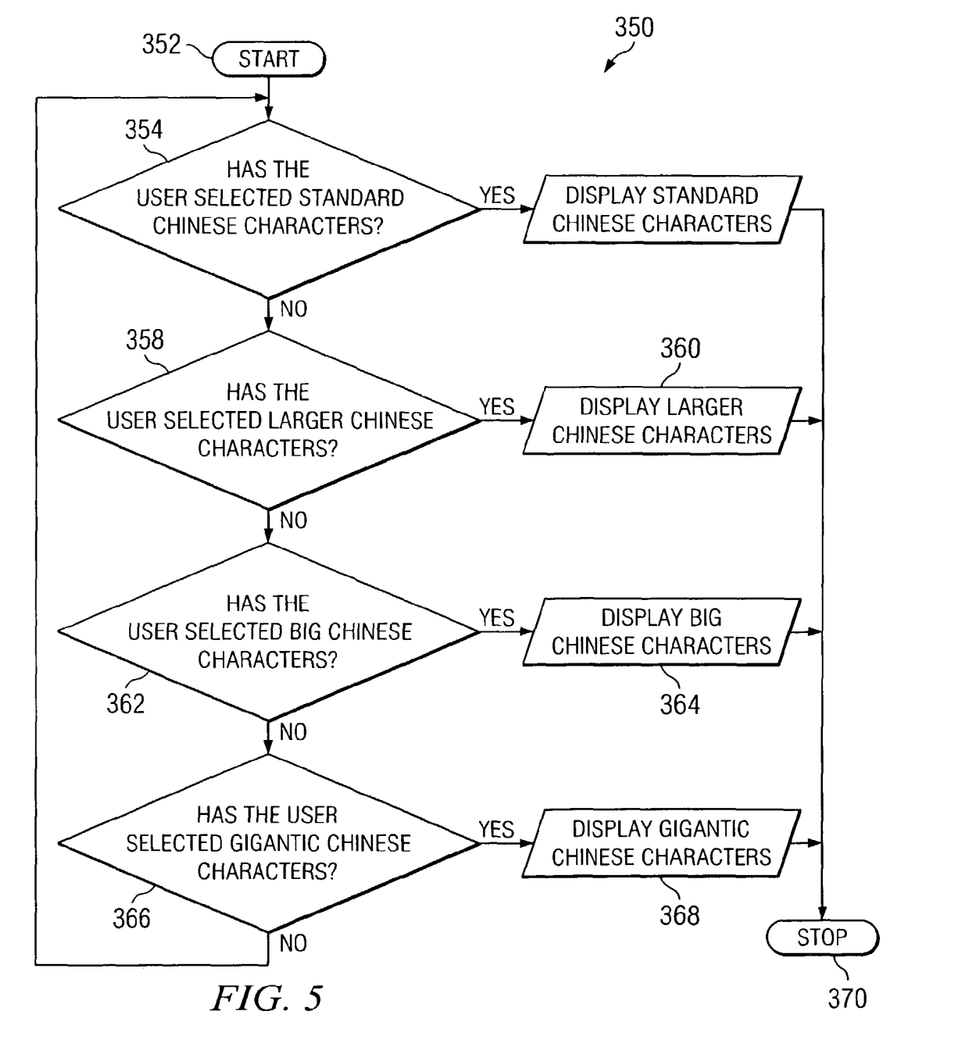
FIG. 5 is an illustration of the logic of the Character Sizing Program (CSP) of the present invention.

FIG. 5 illustrates the logic of the Character Sizing Program (CSP) 350 of the present invention. CSP 350 starts (352) when directed by TP 300. CSP 350 then determines whether the user has selected standard size Chinese characters (354). Standard size characters are the default size characters and are typically twelve-point font size. Persons of ordinary skill may configure the standard size characters to any font size. If CSP 350 determines that the user has not selected standard size Chinese characters, the CSP 350 proceeds to step 358. If CSP 350 determines that the user has selected standard size Chinese characters, CSP 350 displays the Simplified Chinese characters and/or the Traditional Chinese characters in the standard font size (356). CSP 350 then ends (370).

At step 358, CSP 350 determines whether the user has selected larger size Chinese characters (358). Larger size characters are typically sixteen-point font size. Persons of ordinary skill may configure the larger size characters to any font size. If CSP 350 determines that the user has not selected larger size Chinese characters, the CSP 350 proceeds to step 362. If CSP 350 determines that the user has selected larger size Chinese characters, CSP 350 displays the Simplified Chinese characters and/or the Traditional Chinese characters in the larger font size (360). CSP 350 then ends (370).

At step 362, CSP 350 determines whether the user has selected big size Chinese characters (362). Big size characters are typically twenty-point font size. Persons of ordinary skill may configure the big size characters to any font size. If CSP 350 determines that the user has not selected big size Chinese characters, the CSP 350 proceeds to step 366. If CSP 350 determines that the user has selected big size Chinese characters, CSP 350 displays the Simplified Chinese characters and/or the Traditional Chinese characters in the big font size (364). CSP 350 then ends (370).

At step 366, CSP 350 determines whether the user has selected gigantic size Chinese characters (366). Gigantic size characters are typically twenty-four-point font size. Persons of ordinary skill may configure the gigantic size characters to any font size. If CSP 350 determines that the user has not selected gigantic size Chinese characters, the CSP 350 returns to step 354. If CSP 350 determines that the user has selected gigantic size Chinese characters, CSP 350 displays the Simplified Chinese characters and/or the Traditional Chinese characters in the gigantic font size (368). CSP 350 then ends (370).

FIGS. 6 through 12 illustrate GUI 400, GUI 500, GUI 600, and GUI 700 that may be associated with the present invention. GUI 400, GUI 500, GUI 600, and GUI 700 are examples of the contents of the web page embodiment of the present invention. GUI 400, GUI 500, GUI 600, and GUI 700 are also examples of the display of the stand-alone computer program embodiment of the present invention which is operable on a single computer.

Figure 6:
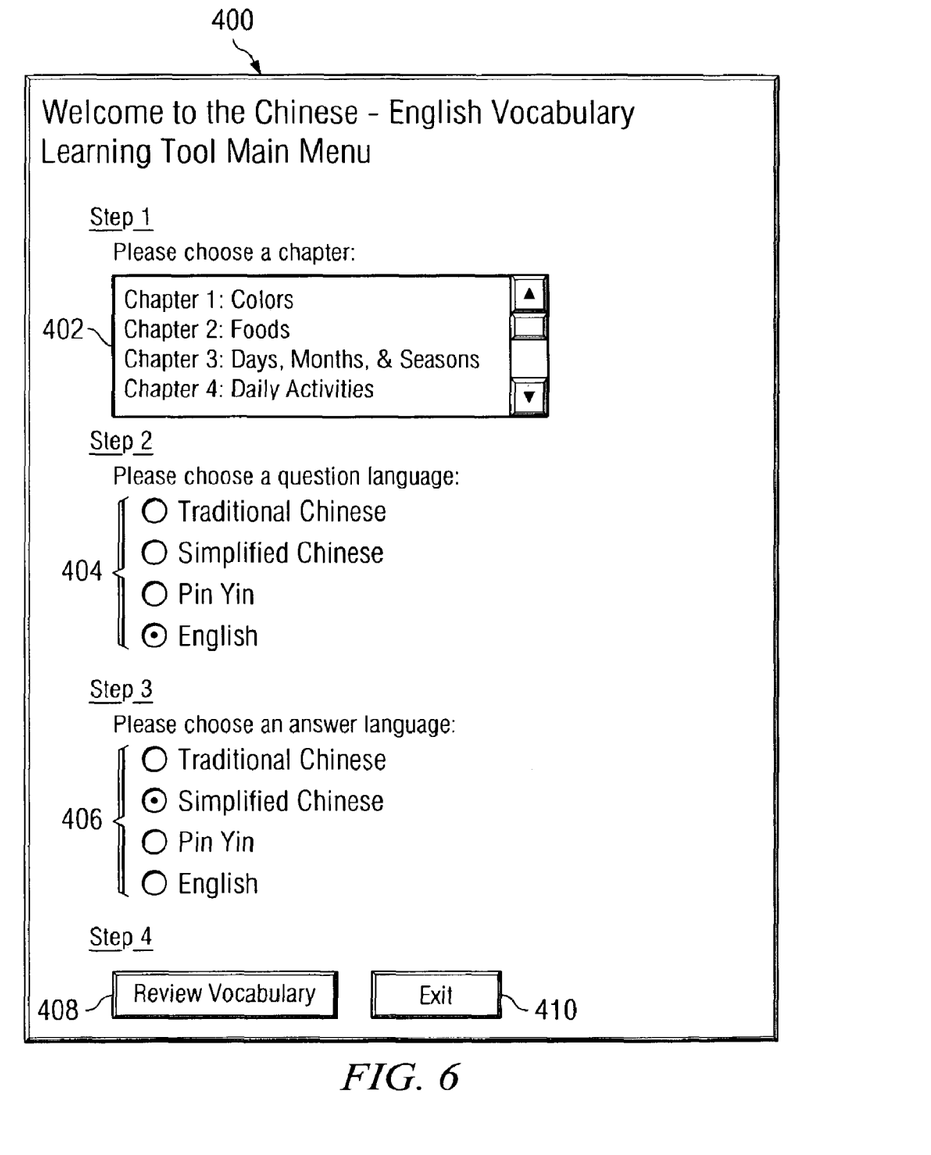
FIG. 6 is an illustration of the graphical user interface (GUI) of the present invention displaying the user selection screen.
Figure 7:
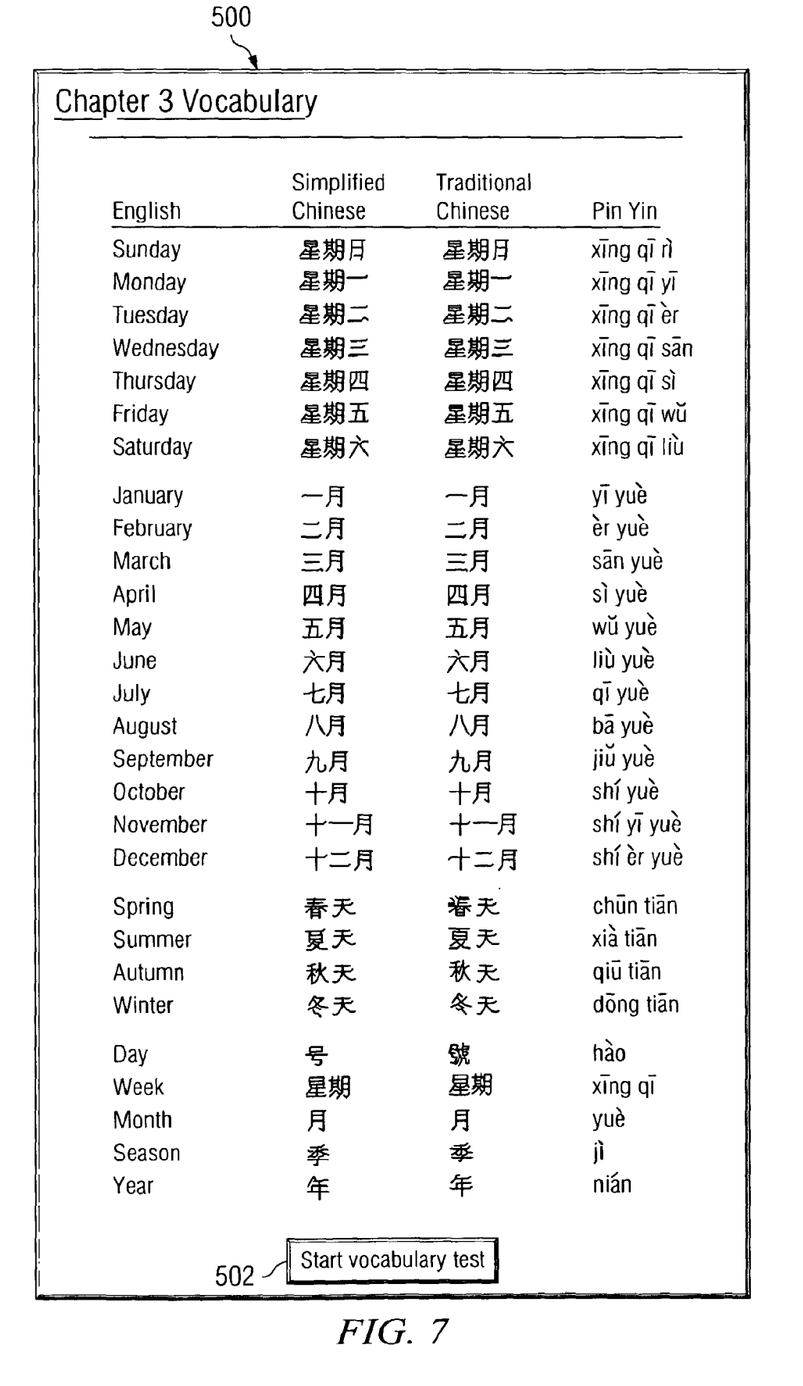
FIG. 7 is an illustration of the GUI of the present invention displaying the vocabulary review screen.

Turning to FIG. 6, GUI 400 is illustrated. GUI 400 is an example of a GUI in which the user is presented with a plurality of decisions to make. The user can select a chapter from chapter menu 402. The user can also select a question language by clicking on one of the question language radio buttons 404. The user may also select and answer language by selecting one of the answer language radio buttons 406. When the user has selected the chapter, question language, and answer language, the user may click the review vocabulary button 408 to proceed to GUI 500. Alternatively, the user may click exit button 410 to exit the program of the present invention.

Turning to FIG. 7, GUI 500 is illustrated. GUI 500 is a screen that allows the user to review the vocabulary before taking the test. When the user has finished reviewing the vocabulary, the user may click the start vocabulary test button 502 to proceed to GUI 600.

FIGS. 8 through 11 illustrate GUI 600 which performs the testing function of the present invention. Turing to FIG. 8, GUI 600 contains current statistics 602 which may be updated and obtained from user statistics 326 in FIG. 4. Current statistics 602 contains the percent of questions answered correctly and the number of questions with a probability factor of one. GUI 600 also contains question 604 in the question language. GUI 600 also contains a user input field 606, submit button 608, and Chinese characters 610. Chinese characters 610 are the Traditional Chinese characters and the Simplified Chinese characters from the vocabulary list in GUI 500. GUI 600 also contains standard size radio button 620, larger size radio button 622, big size radio button 624, and gigantic size radio button 626, which may be used to change the font size of Chinese characters 610. GUI 600 also contains quit button 612, which allows the user to quit the testing program.

Figure 8:
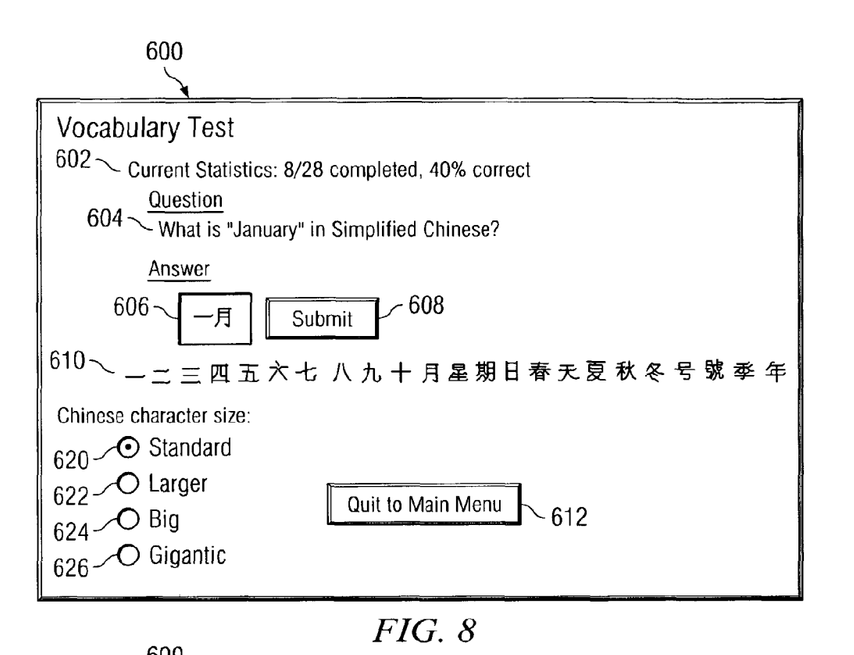
FIG. 8 is an illustration of the GUI of the present invention displaying the testing screen for the first question showing a correct answer.

The user may type English words, Pin Yin words, or Chinese characters directly into user input field 606 and click submit button 608 to submit the answer. Alternatively, the user may click on Chinese characters 610 and the present invention will place the specific Chinese character in the user input field. Further in the alternative, the user may input a character into user input field 606 utilizing the copy-and-paste operation of a computer. In a copy-and-paste operation, the user highlights the desired character, chooses "copy" from a menu, places the cursor in user input field 606, and selects "paste" from a menu. The highlighted character then appears in user input field 606. Persons of ordinary skill in the art are aware of methods for implementing copy-and-paste operations on a computer. The user may also input the character into user input field 606 by any method known by persons of ordinary skill in the art.

As part of the present invention, when the user inputs a character into user input field 606, SP 200 will recognize the entered character regardless of the encoding format used in the highlighted "copy" text. For example, a user may be viewing another web page written in Traditional Chinese and come across a character the user does not recognize. The user may then highlight the unrecognized character, copy the character, paste the character in user input field 606, and click submit button 608 to determine the Simplified Chinese character equivalent for the Traditional Chinese character. The present invention accepts the Big 5 encoding used in the other web page because Big 5 is compatible with Unicode. In another example, a user may be viewing another web page written in Simplified Chinese and come across a character the user does not recognize. The user may then highlight the unrecognized character, copy the character, paste the character in user input field 606, and click submit button 608 to determine the Traditional Chinese character equivalent for the Simplified Chinese character. The present invention accepts the GB2312 encoding used in the other web page because GB2312 is compatible with Unicode. If the present invention was implemented in either Big 5 or GB2312 encoding, the present invention would be limited to either Simplified Chinese or Traditional Chinese, depending on the encoding language. The user may also use the copy and paste function to input English words, accented Pin Yin, hybrid Pin Yin, or unaccented Pin Yin in the ASCII or Unicode formats.

Figure 9:
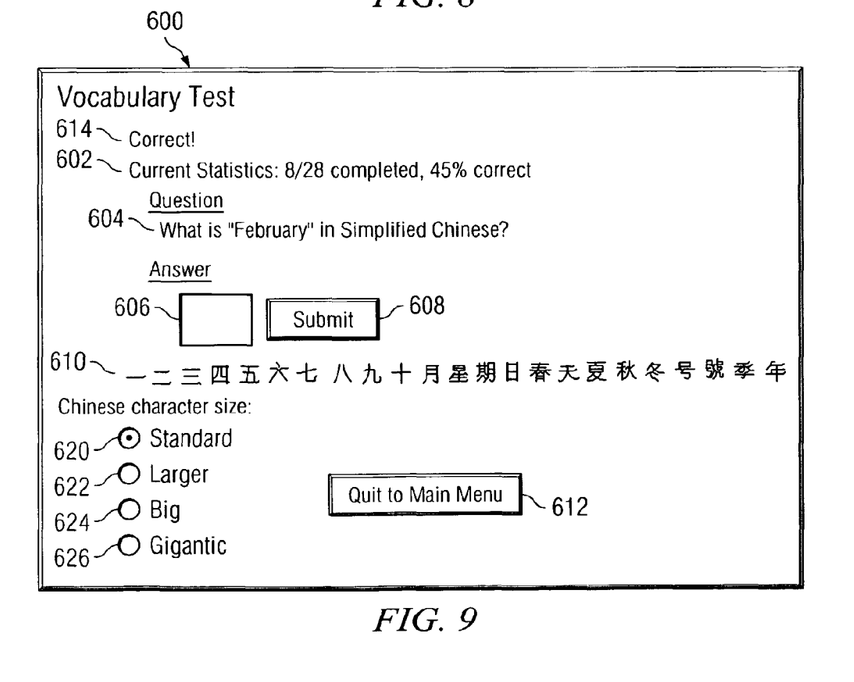
FIG. 9 is an illustration of the GUI of the present invention displaying the testing screen for the second or subsequent question when the previous question was answered correctly.

When the user submits an answer, the present invention determines if the answer is correct. FIG. 8 is an example of a GUI 600 with a correct answer. FIG. 9 is an example of GUI 600 after the user has submitted a correct answer. GUI 600 in FIG. 9 is the same as GUI 600 in FIG. 8 with the exception that GUI 600 in FIG. 9 also contains a statement that the user correctly answered the question 614 and current statistics 602 have been updated.

Figure 10:
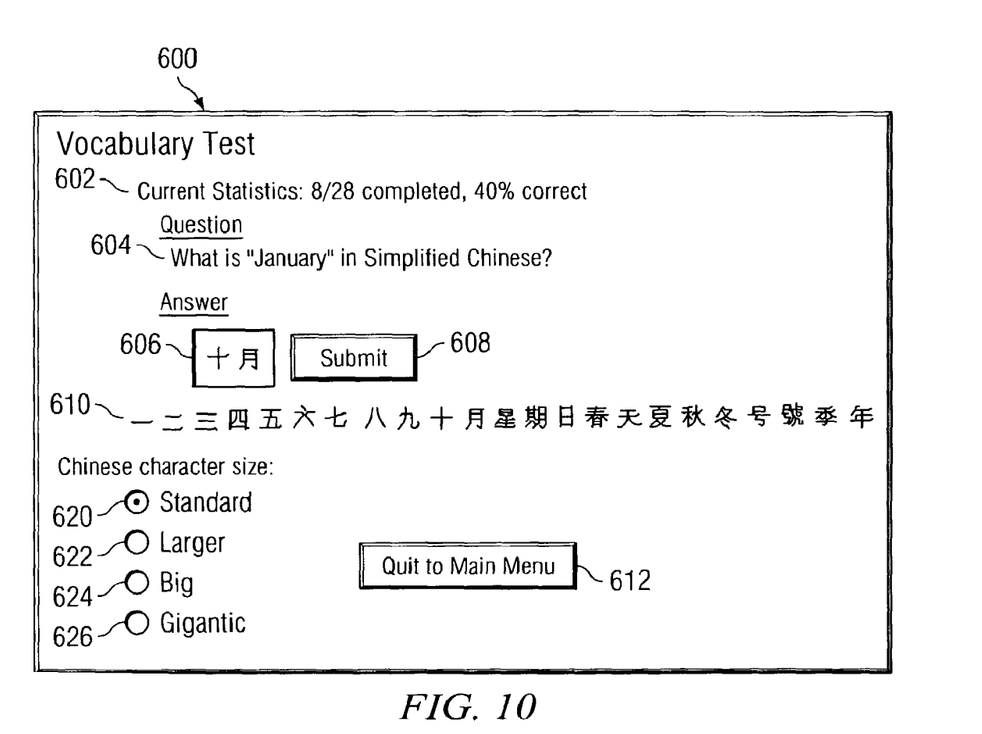
FIG. 10 is an illustration of the GUI of the present invention displaying the testing screen for the first question showing an incorrect answer.
Figure 11:
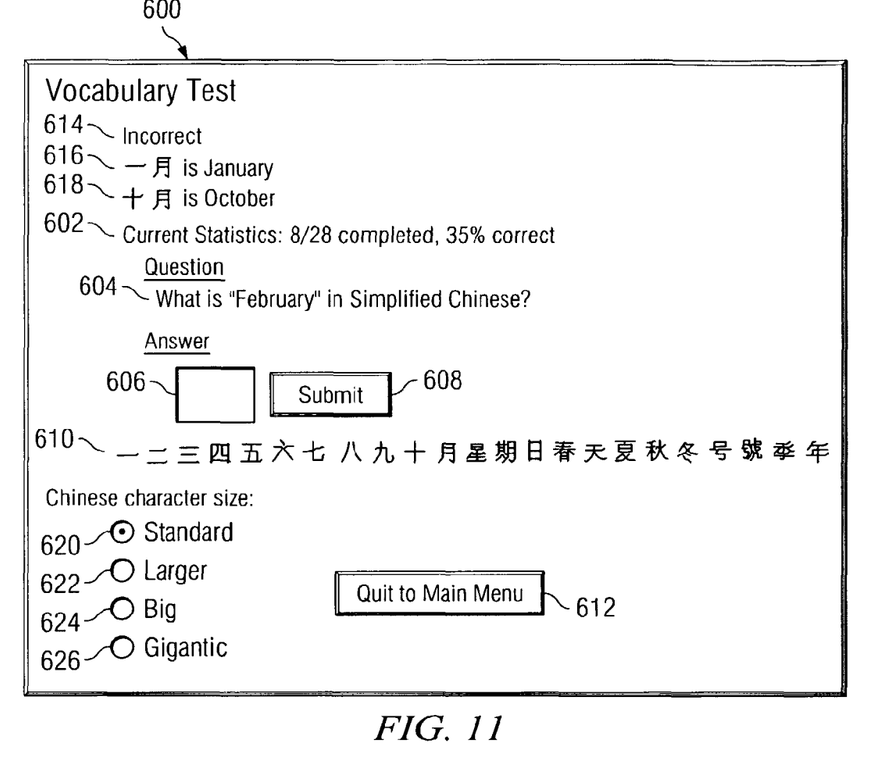
FIG. 11 is an illustration of the GUI of the present invention displaying the testing screen for the second or subsequent question when the previous question was answered incorrectly.

FIG. 10 is an example of a GUI 600 with an incorrect answer. FIG. 11 is an example of GUI 600 after the user has submitted an incorrect answer. GUI 600 in FIG. 11 is the same as GUI 600 in FIG. 10 with the exception that GUI 600 in FIG. 11 also contains a statement that the user incorrectly answered the question 614 and current statistics 602 have been updated. GUI 600 in FIG. 11 also contains the correct answer 616 to the question and the incorrect answer 618 submitted by the user.

Figure 12:
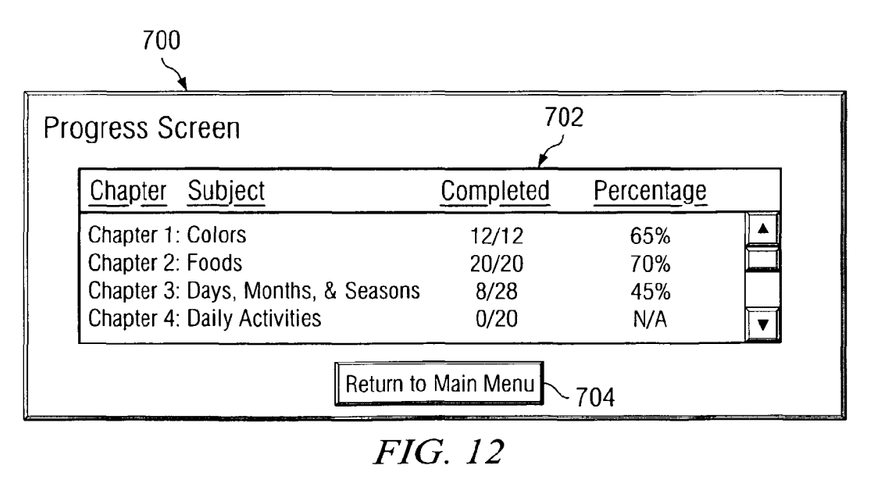
FIG. 12 is an illustration of the GUI of the present invention displaying the user's statistics screen.

FIG. 12 is an example of GUI 700 used to indicate the user's progress through the chapters of the Chinese-English textbook. GUI 700 contains progress report 702 of all of the chapters. Progress report 702 indicates the number of vocabulary terms with a probability factor of one and the percentage correct for each chapter. The user may return to GUI 400 in FIG. 6 by clicking on the return to main menu button 704.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for teaching a vocabulary, the method comprising:
   a computer receiving a user selection of a chapter from a plurality of chapters in a Chinese-English textbook, the chapter including a plurality of vocabulary words;
   the computer receiving a user selection of a language in which to display questions in a user interface, wherein the language in which to display the questions is one of English, Simplified Chinese, Traditional Chinese, and Pin Yin;
   the computer receiving a user selection of a language in which to receive answers to the questions in the user interface, wherein the language in which to receive the answers is another one of English, Simplified Chinese, Traditional Chinese, and Pin Yin, such that the language in which to display the questions and the language in which to receive the answers are different;
   the computer determining a question, the question including a vocabulary word of the plurality of vocabulary words in the language in which to display the questions;
   the computer receiving an answer to the question in the language in which to receive the answers, the answer including a vocabulary word; and
   in response to receiving the answer, the computer determining if the answer is a correct answer.

2. The method of claim 1, wherein the vocabulary word in the question or the vocabulary word in the answer is in Simplified Chinese, and wherein the computer determining if the answer is a correct answer comprises the computer translating the vocabulary word in the question or the vocabulary word in the answer into Traditional Chinese, the translating comprising accessing a Simplified Chinese/Traditional Chinese conversion table.

3. The method of claim 1, wherein the computer determining if the answer is a correct answer comprises the computer determining that the vocabulary word in the question and the vocabulary word in the answer both match an entry in a Traditional Chinese/Pin Yin/English dictionary encoded in Unicode.

4. The method of claim 1, further comprising:
   the computer associating, with each vocabulary word in the plurality of vocabulary words, a value indicating a likelihood that the vocabulary word associated with the value will appear in a question.

5. The method of claim 1, further comprising:
   the computer, responsive to determining that the answer is a correct answer, decrementing a value associated with the vocabulary word indicating a likelihood that the vocabulary word will appear in a question.

6. The method of claim 1, further comprising:
   the computer, responsive to determining that the answer is an incorrect answer, incrementing a value associated with the vocabulary word indicating a likelihood that the vocabulary word will appear in a question.

7. The method of claim 4, further comprising:
   the computer, responsive to determining that the values associated with the plurality of vocabulary words equal a pre-determined value, indicating that the chapter is completed.

8. A computer program product for teaching a vocabulary, the computer program product comprising:
   one or more computer-readable tangible storage devices;
   program instructions that are stored on at least one of the one or more storage devices and that, when executed by a processor, receive a user selection of a chapter from a plurality of chapters in a Chinese-English textbook, the chapter including a plurality of vocabulary words;
   program instructions that are stored on at least one of the one or more storage devices and that, when executed by a processor, receive a user selection of a language in which to display questions in a user interface, wherein the language in which to display the questions is one of English, Simplified Chinese, Traditional Chinese, and Pin Yin;
   program instructions that are stored on at least one of the one or more storage devices and that, when executed by a processor, receive a user selection of a language in which to receive answers to the questions in the user interface, wherein the language in which to receive the answers is another one of English, Simplified Chinese, Traditional Chinese, and Pin Yin, such that the language in which to display the questions and the language in which to receive the answers are different;

program instructions that are stored on at least one of the one or more storage devices and that, when executed by a processor, determine a question, the question including a vocabulary word of the plurality of vocabulary words in the language in which to display the questions;

program instructions that are stored on at least one of the one or more storage devices and that, when executed by a processor, receive an answer to the question in the language in which to receive the answers, the answer including a vocabulary word; and program instructions that are stored on at least one of the one or more storage devices and that, when executed by a processor, determine if the answer is a correct answer in response to receiving the answer.

9. The computer program product of claim 8, wherein the vocabulary word in the question or the vocabulary word in the answer is in Simplified Chinese, and wherein the program instructions that determine if the answer is a correct answer comprise program instructions to translate the vocabulary word in the question or the vocabulary word in the answer into Traditional Chinese, and wherein the program instructions that translate comprise program instructions that access a Simplified Chinese/Traditional Chinese conversion table.

10. The computer program product of claim 8, wherein the program instructions that determine if the answer is a correct answer comprise program instructions that determine that the vocabulary word in the question and the vocabulary word in the answer both match an entry in a Traditional Chinese/Pin Yin/English dictionary encoded in Unicode.

11. The computer program product of claim 8, further comprising:
program instructions that are stored on at least one of the one or more storage devices and that, when executed by a processor, associate, with each vocabulary word in the plurality of vocabulary words, a value indicating a likelihood that the vocabulary word associated with the value will appear in a question.

12. The computer program product of claim 8, further comprising:
program instructions that are stored on at least one of the one or more storage devices and that, when executed by a processor and in response to determining that the answer is a correct answer, decrement a value associated with the vocabulary word indicating a likelihood that the vocabulary word will appear in a question.

13. The computer program product of claim 8, further comprising:
program instructions that are stored on at least one of the one or more storage devices and that, when executed by a processor and in response to determining that the answer is an incorrect answer, increment a value associated with the vocabulary word indicating a likelihood that the vocabulary word will appear in a question.

14. The computer program product of claim 11, further comprising:
program instructions that are stored on at least one of the one or more storage devices and that, when executed by a processor and in response to determining that the values associated with the plurality of vocabulary words equal a pre-determined value, indicate that the chapter is completed.

15. A computer system for teaching a vocabulary, the computer system comprising:
one or more processors and one or more computer-readable tangible storage devices;
program instructions that are stored on at least one of the one or more storage devices and that, when executed by at least one of the one or more processors, receive a user selection of a chapter from a plurality of chapters in a Chinese-English textbook, the chapter including a plurality of vocabulary words;

program instructions that are stored on at least one of the one or more storage devices and that, when executed by at least one of the one or more processors, receive a user selection of a language in which to display questions in a user interface, wherein the language in which to display the questions is one of English, Simplified Chinese, Traditional Chinese, and Pin Yin;

program instructions that are stored on at least one of the one or more storage devices and that, when executed by at least one of the one or more processors, receive a user selection of a language in which to receive answers to the questions in the user interface, wherein the language in which to receive the answers is another one of English, Simplified Chinese, Traditional Chinese, and Pin Yin, such that the language in which to display the questions and the language in which to receive the answers are different;

program instructions that are stored on at least one of the one or more storage devices and that, when executed by at least one of the one or more processors, determine a question, the question including a vocabulary word of the plurality of vocabulary words in the language in which to display the questions;

program instructions that are stored on at least one of the one or more storage devices and that, when executed by at least one of the one or more processors, receive an answer to the question in the language in which to receive the answers, the answer including a vocabulary word; and program instructions that are stored on at least one of the one or more storage devices and that, when executed by at least one of the one or more processors, determine if the answer is a correct answer in response to receiving the answer.

16. The computer system of claim 15, wherein the vocabulary word in the question or the vocabulary word in the answer is in Simplified Chinese, and wherein the program instructions that determine if the answer is a correct answer comprise program instructions to translate the vocabulary word in the question or the vocabulary word in the answer into Traditional Chinese, and wherein the program instructions that translate comprise program instructions that access a Simplified Chinese/Traditional Chinese conversion table.

17. The computer system of claim 15, wherein the program instructions that determine if the answer is a correct answer comprise program instructions that determine that the vocabulary word in the question and the vocabulary word in the answer both match an entry in a Traditional Chinese/Pin Yin/English dictionary encoded in Unicode.

18. The computer system of claim 15, further comprising:
program instructions that are stored on at least one of the one or more storage devices and that, when executed by at least one of the one or more processors, associate, with each vocabulary word in the plurality of vocabulary words, a value indicating a likelihood that the vocabulary word associated with the value will appear in a question.

19. The computer system of claim 15, further comprising:
program instructions that are stored on at least one of the one or more storage devices and that, when executed by at least one of the one or more processors and in response to determining that the answer is a correct answer, decrement a value associated with the vocabulary word indicating a likelihood that the vocabulary word will appear in a question.

20. The computer system of claim 15, further comprising:
program instructions that are stored on at least one of the one or more storage devices and that, when executed by at least one of the one or more processors and in response to determining that the answer is an incorrect answer, increment a value associated with the vocabulary word indicating a likelihood that the vocabulary word will appear in a question.

* * * * *